Oct. 29, 1963 R. J. SLAVECKI ETAL 3,109,057

STEREO SCANNING UNIT AND SYSTEM

Filed Dec. 8, 1960 3 Sheets-Sheet 1

INVENTORS
RONALD J. SLAVECKI
ANGELO J. CAMPANELLA
JOHN L. McLUCAS

BY Harmon & Kurz

ATTORNEY

STEREO SCANNING UNIT AND SYSTEM

Filed Dec. 8, 1960

3 Sheets-Sheet 2

INVENTORS
RONALD J. SLAVECKI
ANGELO J. CAMPANELLA
JOHN L. McLUCAS

BY Harmon & Kurz

ATTORNEY

INVENTORS
RONALD J. SLAVECKI
ANGELO J. CAMPANELLA
JOHN L. Mc LUCAS
BY Harmon & Kurz
ATTORNEY

United States Patent Office 3,109,057
Patented Oct. 29, 1963

3,109,057
STEREO SCANNING UNIT AND SYSTEM

Ronald J. Slavecki and Angelo J. Campanella, State College, and John L. McLucas, Boalsburg, Pa., assignors to HRB-Singer, Incorporated, State College, Pa., a corporation of Delaware Filed Dec. 8, 1960, Ser. No. 74,726
17 Claims. (Cl. 178—6.5)

This invention relates to optical scanning systems generally, and more particularly to an improved stereo scanning unit and system which is particularly suited for use in aerial reconnaissance operations.

Any reconnaissance system which produces only a single reproduction of an area or an installation is limited in scope to that intelligence which may be derived from a single two dimensional presentation of the target. It is well known that multi-look coverage vastly increases the intelligence value of aerial reproductions, since such coverage permits interpreters to view the terrain in three dimensions and to recognize moving objects on the ground. Current optical scanning systems used for aerial reconnaissance take only a single look continuous strip recording. Although some of the systems currently in use utilize a dual channel electro-optical system, the ground area scanned is limited to a thin line of ground area which is perpendicular to the heading of the reconnaissance aircraft. Therefore the reproduction obtained from these systems is limited to a two dimensional representation of the scanned terrain.

It is a primary object of this invention to provide a stereo scanning system capable of producing a three dimensional presentation of a scanned area.

Another object of this invention is to provide a stereo scanning system which provides reproductions of a given target area taken from two different angles.

A further object of this invention is to provide a stereo scanning system including an optical scanning unit which scans a given target area at two different times.

Another object of this invention is to provide a stereo scanning system capable of producing a continuous strip recording of scanned target terrain.

A further object of this invention is to provide a stereo scanning system which includes an adjustable scanning unit capable of scanning at various predetermined angles.

A still further object of this invention is to provide a stereo scanning unit which scans a target from two different angles.

With the foregoing and other objects in view, the invention resides in the following specification and appended claims, certain embodiments and details of construction of which are illustrated in the accompanying drawings in which:

Basically the stereo scanning system of this invention employs an optical scanner having a pair of scanning faces which operate at an oblique angle to alternately scan targets fore and aft of an instantaneous position of a reconnaissance aircraft. As the aircraft moves forward, the rear scanning face scans the target which has previously been covered by the forward scanning face, so that a single target is viewed from two different angles at different times. The radiation received by each scanning face is directed to one of two electro-optical channels, the output of which is passed to a recording unit which provides an individual reproduction of the target as viewed by each scanning face. When these reproductions are properly oriented with respect to one another, it is possible to obtain a stereoscopic presentation of the middle portion of the reproduction or photograph, where the recording is essentially vertical. The distortion on the sides of the strip will prohibit the viewing of this area in stereo.

As the present scanning system views an area at different times, a moving object on the ground will, consequently, occupy two different relative positions on a reproduction of the two images produced by the one system; and the object's movement is easily discernible. This operation, in which a single target area is scanned at two different times at different angles, does not resemble the operation of the presently existing stereo camera systems which take two photos of the same target at the same time from slightly different angles Photographs taken simultaneously from different angles do not shown an object at two positions so that it may be identified as a moving object.

The oblique angle at which the present stereo scanning system operates causes a scanning pattern to be obtained which is essentially in the form of a cone, the axis of which is parallel to the roll axis of the reconnaissance aircraft The trace produced by this scan upon the ground plane is a shallow hyperbola, but this curve is represented as a straight line upon the strip recording medium Therefore the reproduction contains an inherent distortion, which is maximized at the edges thereof, but since, as previously explained, the edges of the reproduction are not suitable for stereo viewing, no significant disadvantage is presented by this situation.

Figure 1:
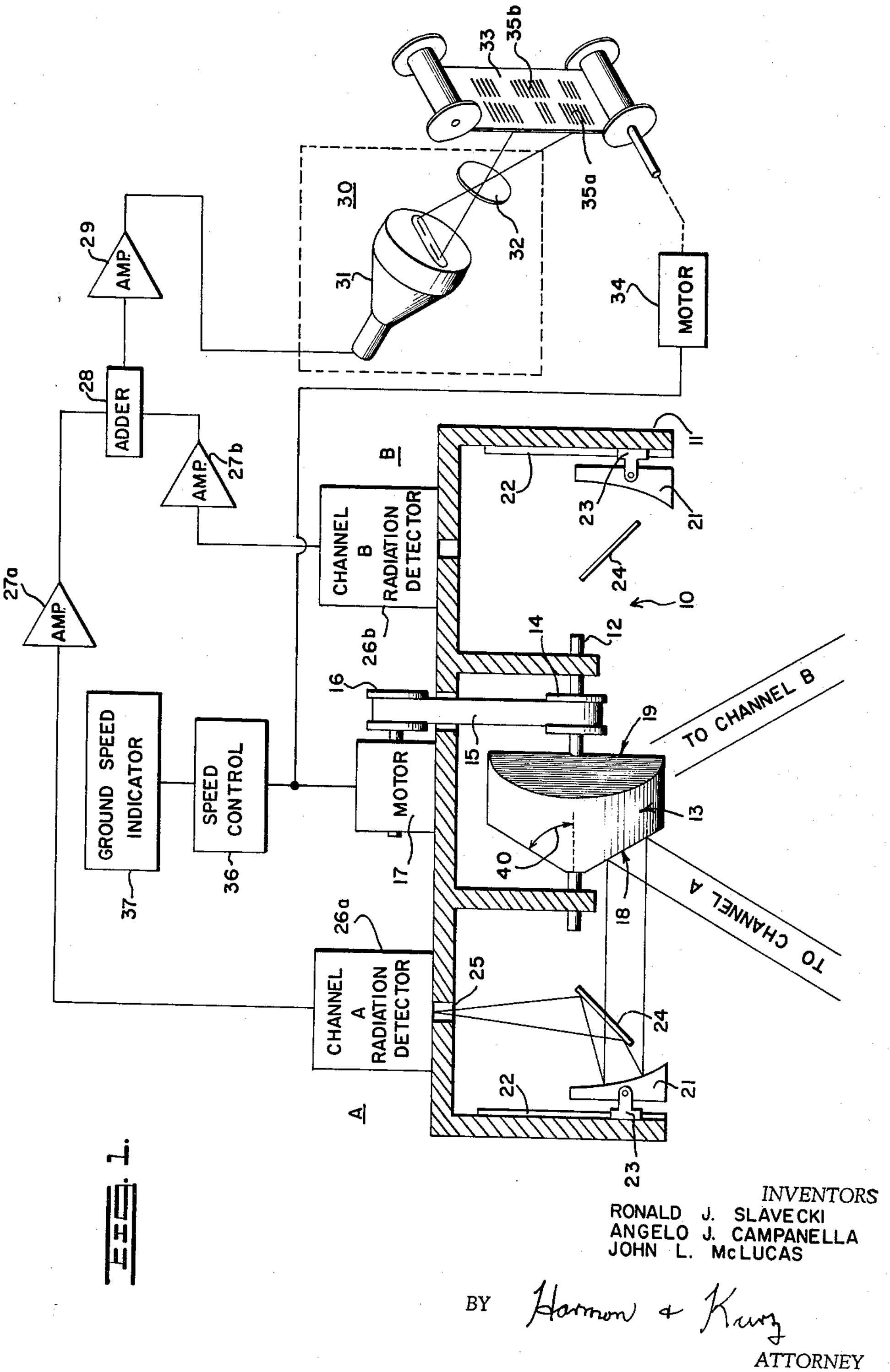
FIGURE 1 is a diagrammatic layout of the stereo system of this invention illustrating the scanning unit in detail.

Referring to FIGURE 1, the stereo scanning system of the present invention indicated generally at 10 includes a housing 11 which supports a rotatable shaft 12. Mounted upon the shaft 12 are a scanning mirror 13 and a drive pulley 14, which are driven by means of a belt 15 extending from a pulley 16 mounted upon the the drive shaft of a motor 17. The scanning mirror 13 is provided with a plurality of oppositely disposed angular scanning faces 18 and 19 (FIGURE 2) arranged about a shaft receiving passage 20. Passage 20 extends axially through the center of the mirror 13. The scanning faces 18 and 19 are arranged in a back to back relationship, and each face is divided into two equal scanning sections indicated at *a1*, *a2*, *b1* and *b2* in FIGURE 2.

The scanning mirror 13 is disposed so that radiation striking the scanning face 18 is reflected to a combined optical and electrical system or channel indicated at A, while the radiation striking the scanning face 19 is reflected to a combined optical and electrical channel indicated at B. The channels A and B contain identical components, so that a description of the electro-optical system of channel A also applies to the system of channel B. The radiation received by the scanning face 18 of the scanning mirror 13 is reflected to a parabolic reflector 21 which is secured within the housing 11. In non variable scanning systems, where only a single angle of scan is required, the parabolic reflector 21 may be immovably secured to the housing 11. However, it is possible to vary the angle of scan by changing the position of the parabolic reflector 21 within the housing 11. Thus, as illustrated in FIGURE 1, the parabolic reflector 21 may be vertically adjusted within a track 22 and angularly adjusted relative to a supporting bracket 23. The radiation received from the scanning mirror 13 is directed from the face of the parabolic reflector 21 to a folding mirror 24 which in turn reflects it through a pin hole 25 to a radiation detector 26. The parabolic reflector 21 and folding mirror 24 are arranged along a common optical axis extending through the mirror 13. The detector 26 may include any suitable electro-magnetic wave sensitive cell which is sensitive to radiation in the visible spectrum, as well as to ultra-violet, infra-red, and radiation in the millimeter wave portion of the electro-magnetic spectrum. The output from the radiation detector is fed through an amplifier 27, an adder 28, and an amplifier 29 to a recorder unit 30. In some cases a gating circuit could be placed between the amplifier 27 and the adder 28 to prevent stray signals from passing through the adder to the recording section from the B channel when a signal is being received from the A channel. The recording unit 30 may include a cathode ray tube 31 to provide a visual representation of the signal from the amplifier 29 as shown by FIGURE 1, or the visual representation may be provided by a glow tube in lieu of the cathode ray tube 31. The output image from the glow tube or cathode ray tube passes through an optical unit 32 and is reproduced upon a film strip 33. Film strip 33 is driven past the optical member 32 by means of a drive motor 34, and the information from channels A and B is separately reproduced on the film as indicated at 35*a* and 35*b*. This information may be recorded on two separate films, or it may be recorded as two side-by-side strip records as illustrated in FIGURE 1. The information may be read from the film by known optical means which will superimpose one image upon the other to provide a stereoscopic presentation.

The driving motors 17 and 34 are controlled by a speed control unit 36 which might include manual means to permit an operator to vary the operating speed of the motors. However, it is often desirable to control the speed of the motors 17 and 34 in accordance with the ground speed and altitude of the reconnaissance aircraft, and in this case the speed control unit 36 receives a controlling signal from a ground speed and altitude responsive device 37 as shown by FIGURE 1.

Figure 2:
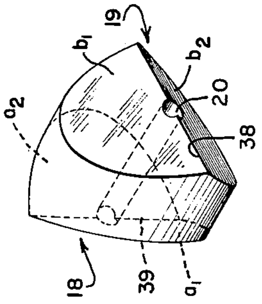
FIGURE 2 is a perspective view of the scanning mirror utilized in FIGURE 1.

Referring to FIGURE 2, it will be noted that the angular scanning sections *b*1 and *b*2 extend away from a central apex line 38, while angular scanning sections *a*1 and *a*2 extend away from a central apex line 39. Line 38 is perpendicular to line 39, so that when scanning section *b*2 is in a radiation receiving and reflecting position as shown by FIGURE 2, no radiation will be transmitted by scanning sections *a*1 and *a*2. Thus when the scanning mirror 13 is rotated by the motor 17, the scanning faces 18 and 19 will alternately scan surface targets. To obtain an oblique scan of targets fore and aft of the aircraft, the angle between the longitudinal axis of the mirror 13 and the mirror faces *a*1, *a*2, *b*1 and *b*2 may be made equal to an arbitrary but fixed value which is greater or less than 45 degrees. In the sketch, this angle is illustrated as being greater than 45 degrees but may be less than 45 degrees. An exact 45 degree angle would be inoperative as the scan of the target would then be normal to the surface. This angle, indicated at 40 in FIGURE 1, may be modified in different scanning mirrors so that the angle of scan is varied. Often it is not desirable to make use of several scanning mirrors in order to obtain a varied scanning angle. In these instances, the angle scanned may also be varied by changing the angle of the parabolic reflectors 21. When the angle between the reflector 21 and the scanning mirror 13 is altered, the optical axis between the reflector and the mirror 13 is also altered, and it is therefore necessary to adjust the parabolic reflector in the channel 22 until a corrected optical axis is obtained.

When the scanning system of FIGURE 1 is put into operation, the mirror 13 will alternately scan areas fore and aft of the reconnaissance aircraft and the radiation received will be separately transmitted to the A and B channels. If the motor 17 is controlled in accordance with a signal from the speed and altitude responsive device 37, the effective time between scans will be a function of the speed of the reconnaissance aircraft and the altitude at which it is flying. A stationary target is first scanned by the forward face 18 of the scanning mirror 13 and the radiation received is transmitted to channel A. The movement of the aircraft along the line of flight provides a new position from which the rear scanning surface 19 scans the same target which has previously been scanned by the surface 18 and transmits the received radiation to channel B.

Figure 3:
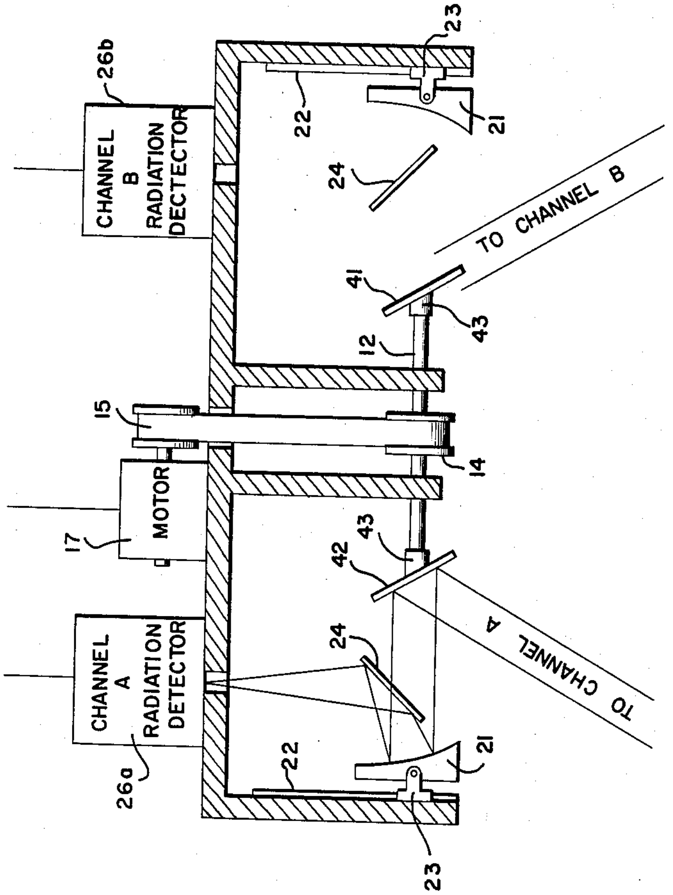
FIGURE 3 is a sectional view in side elevation illustrating a variation of the scanning unit of FIGURE 1.

Referring to FIGURE 3, a modification of the scanning system of FIGURE 1 is illustrated wherein separate adjustable scanning mirrors 41 and 42 are mounted upon the shaft 12 in back to back relationship. The scanning mirrors 41 and 42 may be individually adjusted by means of a connection 43 to vary the angle of scan.

As previously mentioned in connection with the scanning system of FIGURE 1, the operative scanning angle indicated at 40 must be greater or less than 45 degrees. This requirement also applies to the angular relationship between the scanning mirrors 41 and 42 and the shaft 12 of FIGURE 3. The scanning systems of FIGURES 1 and 3, therefore, provide a conical scanning pattern which produces a trace in the form of a shallow hyperbola upon the ground plane. As the scanning faces 18 and 19 of FIGURE 1 and the scanning mirrors 41 and 42 of FIGURE 3 are oppositely directed, these faces describe opposite hyperbolic traces across the ground plane. When the images which are reproduced from these traces upon the film strip 33 of FIGURE 1, are superimposed optically, the viewer is able to obtain a suitable stereoscopic presentation at only the middle portion of the reproduction. As the operative scanning angle of the scanning faces 18 and 19 (FIG. 1) or the scanning mirrors 41 and 42 (FIG. 3) moves further from 45 degrees, a greater hyperbola is traced upon the ground plane and the distortion of the stereoscopic reproduction is increased. Thus the distortion in the stereoscopic reproductions produced by the scanning systems of FIGURES 1 and 3 varies directly as the operative scanning angle is varied from 45 degrees.

Figure 4:
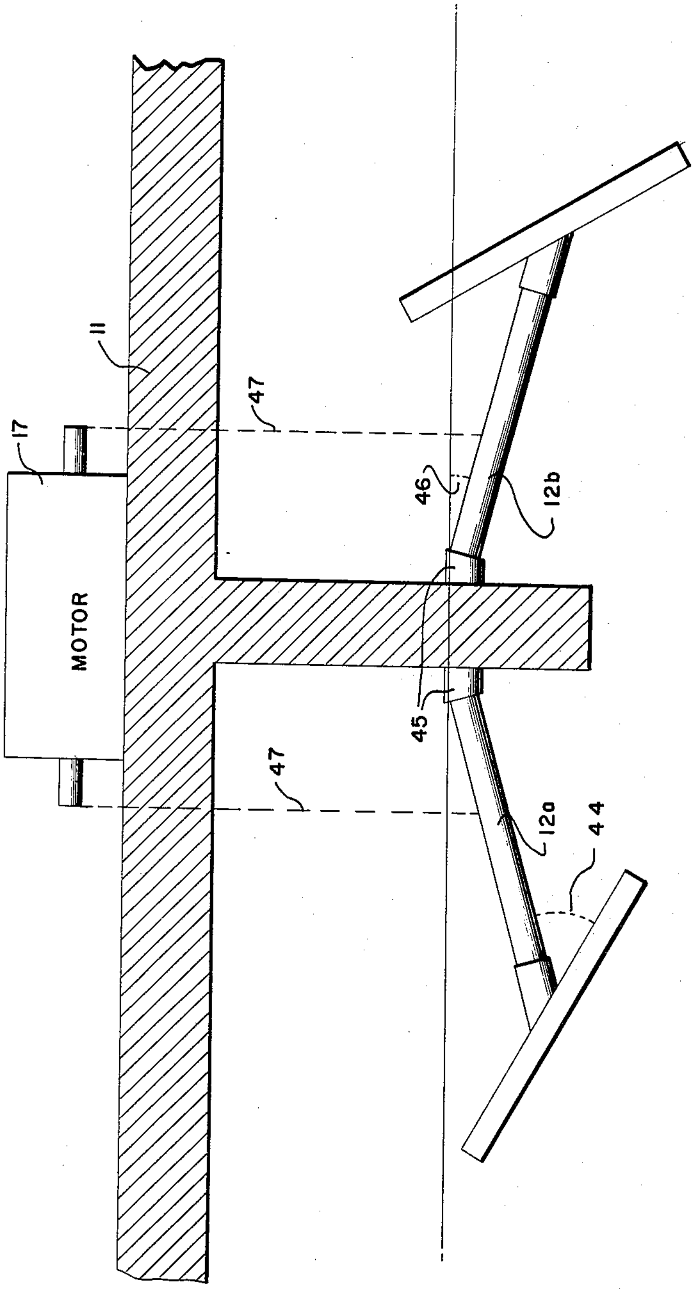
FIGURE 4 is a sectional view in side elevation illustrating an embodiment of the scanning unit of FIGURE 3.

The scanning unit illustrated by FIGURE 4 provides a modification of the unit of FIGURE 3 which acts to reduce the distortion inherent in the stereoscopic reproductions obtained by optically superimposing the images produced by the systems of FIGURES 1 and 3 and which may be conveniently utilized with the system of FIGURE 1. This is accomplished by mounting the scanning mirrors 41 and 42 upon two different axes canted in the vertical plane from the horizontal. Mirrors 41 and 42 are fixed to shafts 12*a* and 12*b* and are tilted to maintain a 45 degree angle relative to the axis of the shafts as indicated at 44. Shafts 12*a* and 12*b* are rotatably mounted in any suitable manner such as journals 45 which are carried by the housing 11, and each of the shafts is equally displaced from the horizontal plane by an angle indicated at 46. Angle 46 can be of any predetermined magnitude, depending upon the oblique scan angle desired. The shafts 12*a* and 12*b* are rotated in journals 45 by suitable drive means 47, which may be flexible shafting, shown in broken lines, extending between the shafts and motor unit 17.

The scanning unit of FIGURE 4 does not inscribe a hyperbolic trace across the ground plane as do the units of FIGURES 1 and 3, for the scanning cone produced by each of the scanning mirrors of FIGURE 4 degenerates into a plane which intersects the ground plane in a straight line. Therefore, two straight line traces are provided, and the images produced by utilizing this scanning unit may be optically superimposed to obtain a stereoscopic reproduction having a minimum amount of inherent distortion.

Numerous methods other than those heretofore described may be utilized with the stereo scanning system of the present invention. A modification in the oblique scanning angle may also be obtained by varying the position of the radiation detector 26 along the longitudinal axis of the housing 11.

In some instances it might be desirable to modify only one channel of the stereo scanning system to the oblique look in order to reduce the distortion at the edges of the reproduction. In this case, one scanning surface would scan at an oblique angle and the remaining surface would produce a linear scanning vertical reproduction. If this scanning method were utilized with the systems of FIGURE 1 or 3, the reproduction produced by the two channels A and B could still be oriented to gain a stereo presentation, but the degree of stereo obtained would not be as great as that obtained by the systems of FIGURES 1 and 3. Also less time would exist between the successive viewing of the target by the A and B channels, but the distortion at the edges of the reproduction would be minimized.

It will be readily apparent to those skilled in the art that the present invention provides a novel and improved stereo scanning system which is capable of presenting a three dimentional representation of a single target.

The arrangement and types of components utilized within this invention may be subject to numerous modifications well within the purview of these inventors who intend only to be limited to a liberal interpretation of the specification and appended claims.

We claim:

1. A stereo scanning system for a moving vehicle comprising scanning means rotatable about a central longitudinal axis, dual scanning faces arranged to alternately scan a single target surface at two different oblique angles relative to said central axis and to reflect the radiation received therefrom, dual electro-optical channels for separately receiving the reflected radiation from each of said dual scanning faces and transforming said radiation into electrical signals, and a recorder unit for producing separate strip reproductions of the signal from each of said electro-optical channels.

2. A stereo scanning system for a moving vehicle comprising scanning means rotatable about a central axis, said scanning means including two oppositely directed optical scanning faces arranged in back-to-back relationship, said scanning faces alternately scanning a single target surface at two different oblique angles and reflecting the radiation received therefrom, dual electro-optical channels for separately receiving the reflected radiation from each of said dual scanning faces and transforming said radiation into electrical signals, and a recorder unit for producing separate strip reproductions of the signal from each of said electro-optical channels.

3. The stereo scanning system of claim 2 in which said scanning means includes a single scanning mirror having oppositely directed scanning faces.

4. The stero scanning system of claim 3 in which each of said oppositely directed scanning faces of said single scanning mirror is centrally divided into two equal scanning sections, each of said scanning sections extending angularly away from a central apex line through the center of said scanning faces.

5. The stereo scanning system of claim 4 in which the apex line through the center of one of said oppositely directed scanning faces extends perpendicularly to the apex line through the center of the remaining scanning face so that the scanning sections of said oppositely directed scanning faces alternately view a target surface.

6. A stereo scanning system for a moving vehicle comprising scanning means rotatable about a central axis, said scanning means including two oppositely directed individual scanning mirrors mounted for rotation about said central axis, said scanning mirrors including two oppositely directed optical scanning faces arranged in back-to-back relationship for alternately scanning a single target surface at two different oblique angles and reflecting the radiation received therefrom, dual electro-optical channels for separately receiving the reflected radiation from each of said scanning faces and transforming said radiation into electrical signals, and a recorder unit for producing separate strip reproductions of the signal from each of said electro-optical channels.

7. The stereo scanning system of claim 6 in which said individual scanning mirrors may be separately adjusted to a plurality of oblique angles relative to said central axis.

8. A stereo scanner for use in aerial reconnaissance comprising rotatable scanning means for alternately scanning a single target surface at two different oblique angles and reflecting the radiation received therefrom, said scanning means including a single scanning unit having oppositely directed optical scanning faces arranged in back-to-back relationship, each said scanning face being centrally divided into two equal scanning sections which extend angularly away from a central apex line through the center of each scanning face, and spaced optical elements arranged along an optical axis to receive the reflected energy from said scanning means, said optical elements directing said energy to an energy responsive output means.

9. The stereo scanner of claim 8 in which each of said oppositely directed scanning faces is centrally divided into two equal scanning sections, each of said scanning sections extending angularly away from a central apex line through the center of said scanning faces.

10. The stereo scanner of claim 9 in which the apex line through the center of one of said oppositely directed scanning faces extends perpendicularly to the apex line through the center of the remaining scanning face so that the scanning sections of said oppositely directed scanning faces alternately view a target surface.

11. A stereo scanner for use in aerial reconnaissance comprising a rotatable scanning means for alternately scanning a single target surface at two different oblique angles and reflecting the radiation received therefrom, said scanning means including two oppositely directed individual scanning mirrors mounted for rotation about a single axis, and spaced optical elements arranged along an optical axis to receive the reflected energy from said scanning means, said optical elements directing said energy into an energy responsive output means.

12. The stereo scanner of claim 11 in which said individual scanning mirrors may be separately adjusted to a plurality of oblique angles relative to said central axis.

13. A stereo scanner for use in aerial reconnaissance comprising a rotatable scanning unit for alternately scanning a single target surface at two different oblique angles and reflecting the radiation received therefrom, said scanning unit including two oppositely directed scanning faces arranged in back-to-back relationship, and spaced optical elements arranged along an optical axis relative to each of said scanning faces to receive the reflected energy from said scanning faces, said optical elements including a parabolic reflector for receiving and reflecting energy from said scanning faces and a folding mirror for receiving and reflecting energy from said parabolic reflector to an energy responsive output means, said parabolic reflector being angularly adjustable to vary the angular relationship of the energy received from said scanning faces.

14. The stereo scanner of claim 13 in which said scanning unit includes a single scanning mirror having two oppositely directed scanning faces arranged in back-to-back relationship, each said scanning face being divided into two equal scanning sections, each of which extends angularly away from a central apex line through the center of said scanning faces, the apex line through the center of one of said oppositely directed scanning faces extending perpendicularly to the apex line through the center of the remaining scanning face so that the scanning sections of said oppositely directed scanning faces alternately view a single target surface.

15. The stereo scanner of claim 13 in which said scanning unit includes two oppositely directed individual scanning mirrors mounted for rotation about a single central axis, said individual scanning mirrors being capable of separate adjustment to a plurality of oblique angles relative to said central axis.

16. A stereo scanning system for a moving vehicle comprising scanning means rotatable about a central axis, said scanning means including two oppositely directed individual scanning mirrors individually mounted upon separate rotatable shafts at a fixed 45 degree angle to the axis of rotation of said shafts, the axis of rotation of said shafts being equally displaced from the horizontal plane, said individual scanning mirrors including oppositely directed optical scanning faces for alternately scanning a single target at two different oblique angles and reflecting the radiation received therefrom, dual electro-optical channels for separately receiving the reflected radiation from each of said scanning faces and transforming said radiation into electrical signals, and a recorder unit for producing separate strip reproductions of the signals from each of said electro-optical channels.

17. A stereo scanner for use in aerial reconnaissance comprising rotatable scanning means for alternately scanning a single target surface at two different oblique angles and reflecting the radiation received therefrom, said rotatable scanning means including two oppositely directed scanning mirrors individually mounted upon separate rotatable shafts at a fixed 45 degree angle to the axis of rotation of said shafts, the axis of rotation of said shafts being equally displaced from the horizontal plane, and spaced optical elements arranged along an optical axis to receive the reflected energy from said scanning means, said optical elements directing said energy to an energy responsive output means.

References Cited in the file of this patent

UNITED STATES PATENTS

| | | |
|---|---|---|
| 1,841,487 | Lewis | Jan. 19, 1932 |
| 2,415,981 | Wolff | Feb. 18, 1947 |
| 2,798,115 | Wiens | July 2, 1957 |
| 2,856,809 | Blackstone | Oct. 21, 1958 |
| 2,859,653 | Blackstone | Nov. 11, 1958 |